(12) United States Patent
Morrill

(10) Patent No.: US 9,487,147 B1
(45) Date of Patent: Nov. 8, 2016

(54) TRAILER HITCH STEP ASSEMBLY

(71) Applicant: Jerry E. Morrill, Tabor, IA (US)

(72) Inventor: Jerry E. Morrill, Tabor, IA (US)

( * ) Notice: Subject to any disclaimer, the term of this patent is extended or adjusted under 35 U.S.C. 154(b) by 0 days.

(21) Appl. No.: 15/133,632

(22) Filed: Apr. 20, 2016

(51) Int. Cl.
  *B60R 3/00* (2006.01)
  *B60R 3/02* (2006.01)
  *B60D 1/07* (2006.01)
  *B60R 9/06* (2006.01)

(52) U.S. Cl.
  CPC .............. *B60R 3/007* (2013.01); *B60D 1/07* (2013.01); *B60R 3/00* (2013.01); *B60R 3/02* (2013.01); *B60R 9/06* (2013.01)

(58) Field of Classification Search
  None
  See application file for complete search history.

(56) References Cited

U.S. PATENT DOCUMENTS

| | | |
|---|---|---|
| 3,330,577 A | 7/1967 | Mills |
| 3,606,382 A | 9/1971 | Pollock |
| 3,730,556 A | 5/1973 | Aldape |
| 3,853,369 A | 12/1974 | Holden |
| 3,876,230 A * | 4/1975 | Phillips ................. B60R 3/02 280/166 |
| 3,889,997 A | 6/1975 | Schoneck |
| 5,803,475 A | 9/1998 | Dick |
| 5,957,237 A * | 9/1999 | Tigner ................. B60R 3/02 182/127 |
| 6,170,843 B1 | 1/2001 | Maxwell et al. |
| 7,021,694 B1 | 4/2006 | Roberts et al. |
| 7,114,736 B2 | 10/2006 | Stodola et al. |
| 2009/0243249 A1* | 10/2009 | Arvanites ............. B60R 3/007 280/166 |

FOREIGN PATENT DOCUMENTS

IT     EP 0961006 B1 *  1/2004  ............ E06C 1/387

* cited by examiner

*Primary Examiner* — J. Allen Shriver, II
*Assistant Examiner* — Hilary L Johns
(74) *Attorney, Agent, or Firm* — Dennis L. Thomte; Thomte Patent Law Office LLC

(57) ABSTRACT

A trailer hitch step assembly is configured to be secured to the rearward end of a receiver hitch mounted at the rear end of a pick-up truck. The trailer hitch step assembly is selectively pivotally movable from an operative position to a folded stowed position. When the trailer hitch step assembly is in its operative position, the steps thereof are positioned rearwardly of the tailgate of the truck when the tailgate is in its open position. The trailer hitch step assembly, when in its stowed position, enables the trailer hitch step assembly to be easily transported by the truck or removed from a truck and stowed.

2 Claims, 6 Drawing Sheets

TRAILER HITCH STEP ASSEMBLY

BACKGROUND OF THE INVENTION

1. Field of the Invention

This invention relates to a trailer hitch step assembly and more particularly relates to a trailer hitch step assembly which is movable between an operative position and a folded stowed position. Even more particularly, the invention relates to a trailer hitch step assembly wherein the steps thereof are positioned rearwardly of an extended or lowered tailgate of a pickup truck.

2. Description of the Related Art

Campers and tents have been designed for placement in the box of a pickup truck. In some cases the rearward end of the camper or tent is positioned at the forward side of the tailgate of the truck. When the rearward end of the camper or tent is positioned at the forward side of the tailgate, the tailgate must be opened to enable a person to gain access to the camper or tent. When the tailgate is in the open position, it is difficult for a person to climb over the horizontally disposed tailgate. In many cases, the rearward end of the camper or tent is positioned on the open tailgate of the truck. When the rearward end of the camper or tent is positioned on the open tailgate, it is difficult for a person to step or crawl onto the tailgate to gain access to the camper or tent.

Many types of vehicle steps have been previously provided but the prior art vehicle steps are not positioned at the rearward end of an open tailgate. Additionally, to the best of inventor's knowledge, no one has previously provided a folding step assembly which is secured to the truck hitch receiver with the step assembly being capable of being folded for storage or transport by the truck.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A trailer hitch step assembly is disclosed which is adapted for attachment to a hitch receiver having an open rearward end with the hitch receiver being mounted on the rearward end of a truck having a tailgate which is movable between open and closed positions. The assembly includes an elongated and horizontally disposed support arm having a forward end, a rearward end, an upper side and a lower side. The forward end of the support arm is configured to be received in the open rearward end of the hitch receiver and selectively removably secured thereto. A horizontally disposed first step is positioned on the upper side of the support arm and is fixedly secured thereto at the rearward end of the support arm. The assembly also includes a second step which is positioned below the first step and which is pivotally secured to the first step by pivot arms whereby the second step may be pivotally moved from a stowed folded position to an operative position wherein the second step is located below and rearwardly of the first step.

A second step may be pivotally moved to a folded stowed position relative to the first step and the support arm wherein the second step is positioned at the underside of the support arm forwardly of the first step. Structure is provided for maintaining the second step in its folded stowed position. Further, structure is provided for selectively maintaining the second step in its operative position.

The pivot arms, which interconnect the second step to the first step, also include a generally U-shaped support which extends upwardly and forwardly from the assembly.

It is therefore a principal object of the invention to provide a trailer hitch assembly which is movable between an operative position and a folded stowed position with respect to a truck.

A further object of the invention is to provide a trailer hitch step assembly which is secured to a hitch receiver positioned at the rearward end of the truck.

A further object of the invention is to provide a trailer hitch step assembly wherein the trailer hitch step assembly is positioned rearwardly of the tailgate of the truck when the tailgate is in its open position.

A further object of the invention is to provide a trailer hitch step assembly which enables a person to step upwardly over an open tailgate of a truck.

A further object of the invention is to provide a trailer hitch step assembly which is easily movable between an operative position and a folded stowed position.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
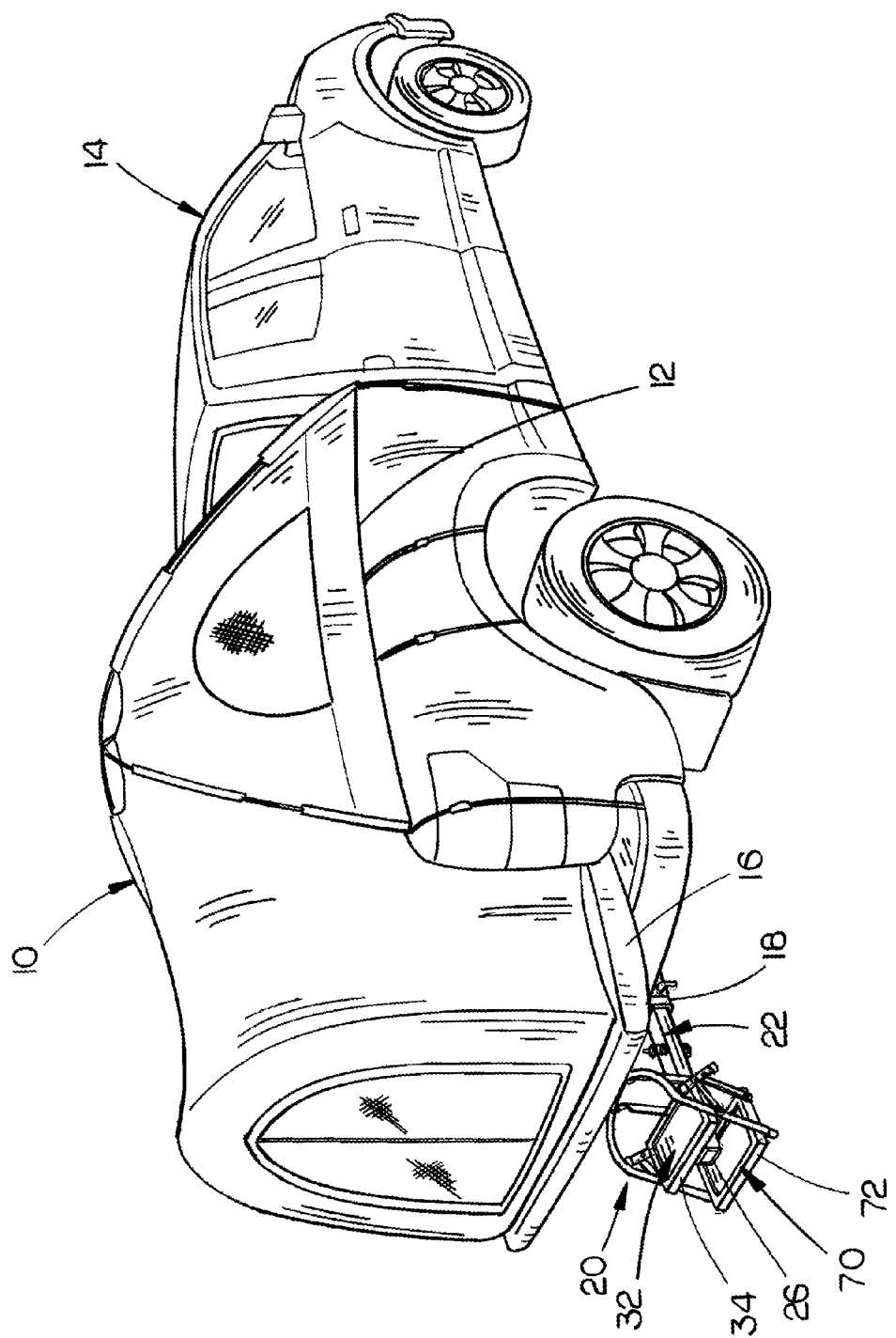
FIG. 1 is a rear perspective view of a pickup truck having a tent in box of the truck and which illustrates the trailer hitch step assembly of this invention in its operative position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a camper or tent which is positioned in the box 12 of a pick-up truck 14. The box 12 has a conventional tailgate 16 at its rearward end which is pivotally movable between closed and open positions. Truck 14 has a conventional hitch receiver 18 at its rearward end.

The numeral 20 refers to the trailer hitch step assembly of this invention. The trailer hitch step assembly includes an elongated and horizontally disposed support arm 22 having a forward end 24, a rearward end 26, an upper side 28, and a lower side 30. The forward end 24 of support arm 22 is received in the open rearward end of receiver 18 and is secured thereto in conventional fashion.

The numeral 32 refers to a horizontally disposed first step having a rearward end 34, a forward end 36, a first side 38, a second side 40, an upper side 42 and a lower side 44. The first step 32 is positioned on the upper side of the support arm 22 and is fixedly secured thereto at the rearward end 26 of the support arm 22 by any convenient means such as welding or the like. The numeral 46 refers to a first pivot arm having a first end 48 and a second end 50. The first end 48 of the first pivot arm 46 is pivotally secured to the first side 38 of the first step 32 adjacent the forward end 36 of the first step 32.

The numeral 52 refers to an elongated second pivot arm having a first end 54 and a second end 56. The first end 54 of the second pivot arm 52 is pivotally secured to the second side 40 of the first step 32 adjacent the forward end 36 of the first step 32.

The numeral 58 refers to an elongated third pivot arm having a first end 60 and a second end 62. The third pivot arm 58 is pivotally secured, intermediate its length at 63, to the first side 38 of the first step 32 forwardly of the rearward end 34 of the first step 32.

The numeral 64 refers to an elongated fourth pivot arm having a first end 66 and a second end 68. The fourth pivot arm 64 is pivotally secured, intermediate its length 69, to the second side 40 of the first step 32 forwardly of the rearward end 34 of the first step 32.

The numeral 70 refers to a horizontally disposed second step having a rearward end 72, a forward end 74, a first side 76, a second side 78, an upper side 80 and a lower side 82. As seen in the drawings, the second step 70 is positioned below the first step 32. The second end 62 of the third pivot arm 58 is pivotally secured to the first side 76 of the second step 70 adjacent the rearward end 72 of the second step 70.

The second end 50 of the first pivot arm 46 is pivotally secured to the first side 76 of the second step 70 adjacent the forward end 74 of the second step 70. The second end 56 of the second pivot arm 52 is pivotally secured to the second side 78 of the second step 70 adjacent the forward end 74 of the second step 70.

The numeral 84 refers to a generally U-shaped support having a first end 86 and second end 88. The first end 86 of the generally U-shaped support 84 is secured to the first end 60 of the third pivot arm 58. The second end 88 of the generally U-shaped support 84 is secured to the first end 66 of the fourth pivot arm 64. As seen in the drawings, the generally U-shaped support extends upwardly and forwardly from the first ends 60 and 66 of the third and fourth pivot arms 58 and 64 respectively.

The numeral 90 refers to a fifth pivot arm having a first end 92 and a second end 94. The first end 92 of the fifth pivot arm 90 is pivotally secured to the third pivot arm 58 adjacent the first end 60 of pivot arm 58.

The numeral 96 refers to an elongated sixth pivot arm having a first end 98 and a second end 100. The first end 98 of the sixth pivot arm 96 is pivotally secured to the fourth pivot arm 64 adjacent the first end 66 of the fourth pivot arm 64.

The numeral 102 refers to an elongated seventh pivot arm having a first end 104 and a second end 106. The second end 94 of the fifth pivot arm 90 is pivotally secured to the seventh pivot arm 102 adjacent the first end 104 of the seventh pivot arm 102.

The numeral 108 refers to an elongated eighth pivot arm having a first end 110 and a second end 112. The second end 100 of the sixth pivot arm 96 is pivotally secured to the eighth pivot arm 108 adjacent the second end 112 of the eighth pivot arm 108.

Figure 2:
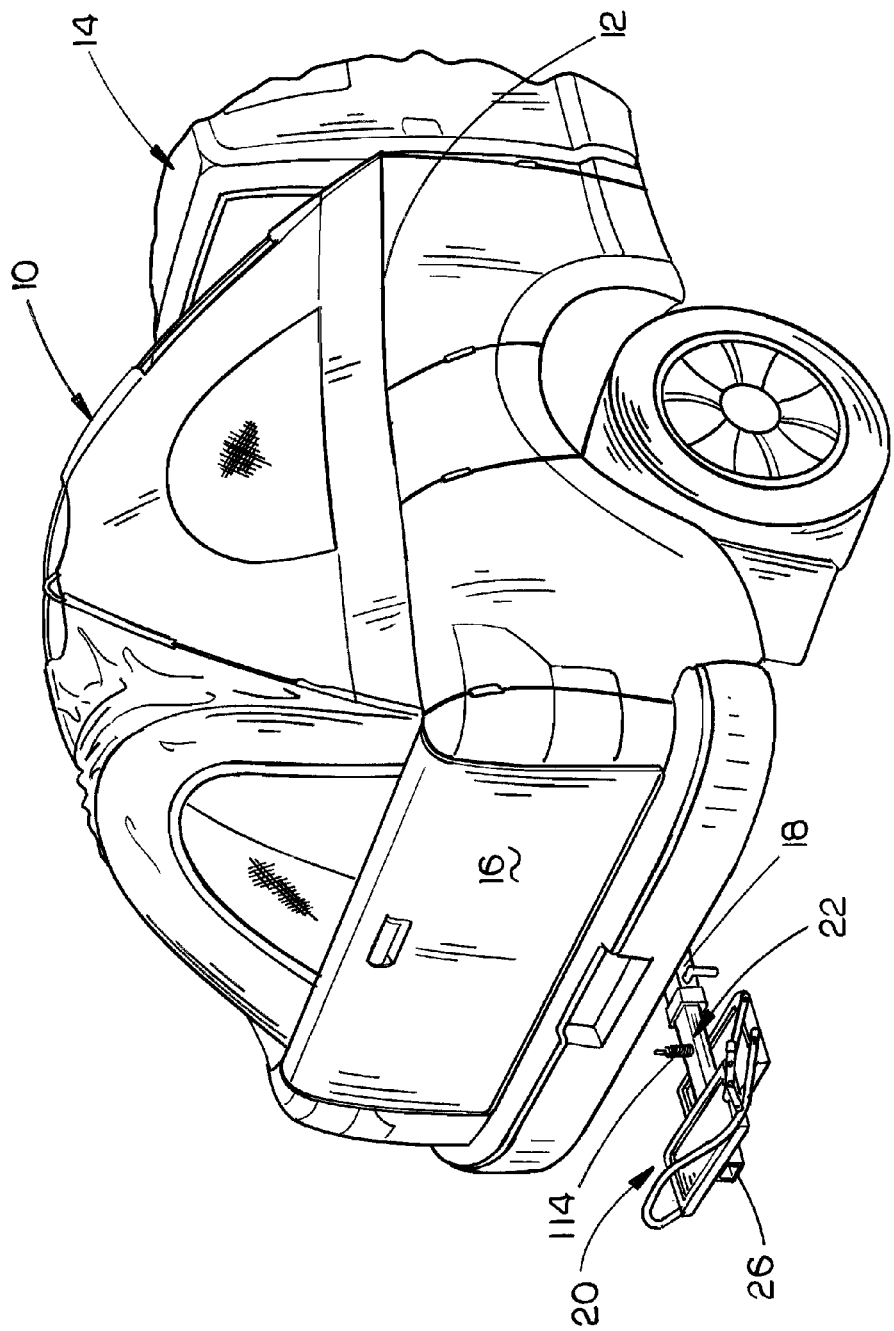
FIG. 2 is a rear perspective view similar to FIG. 1 but which illustrates the tent in a transport position and the trailer hitch step assembly of this invention in its folded stowed transport position.
Figure 3:
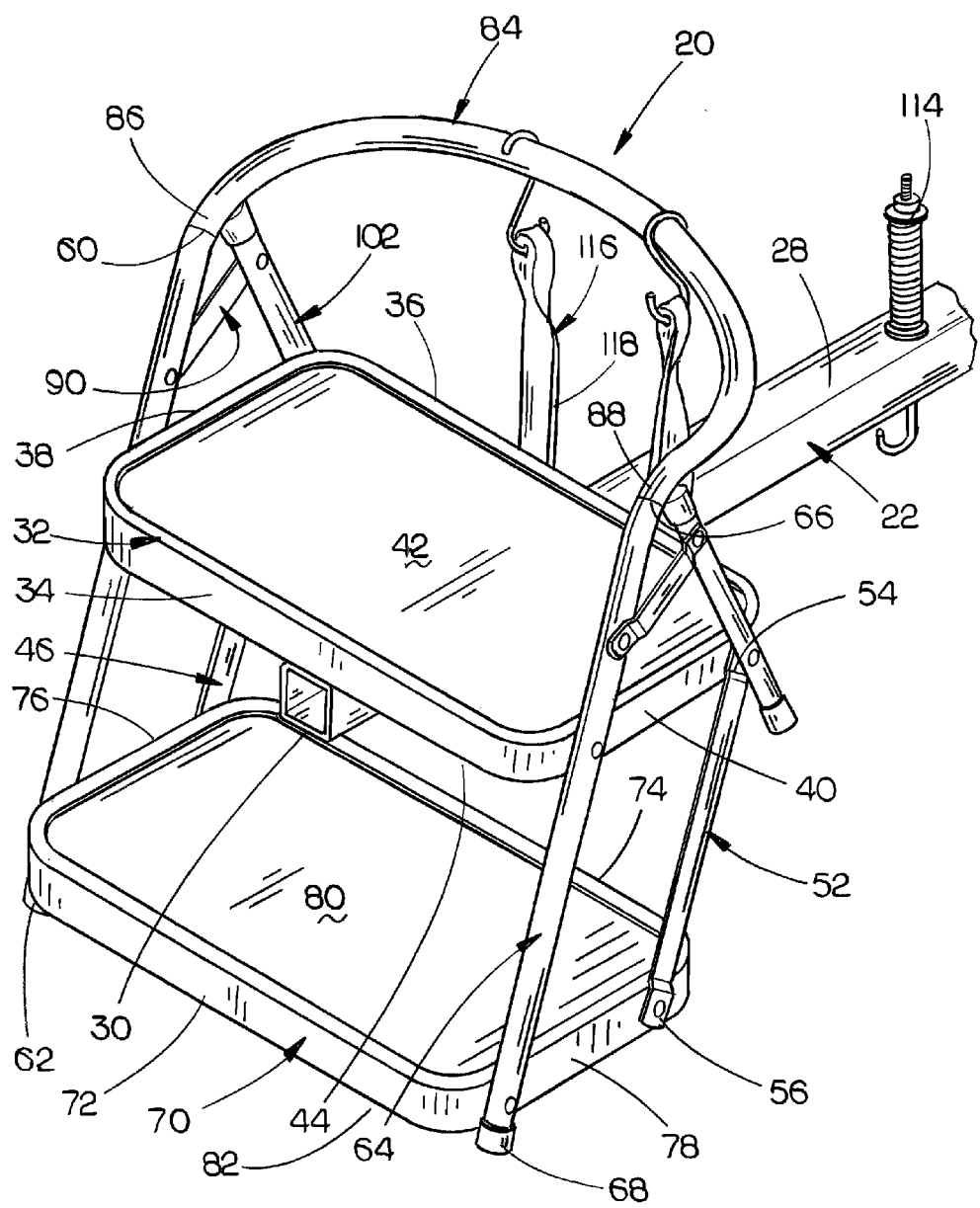
FIG. 3 is a partial rear perspective view of the trailer hitch step assembly of this invention in its operative position.
Figure 4:
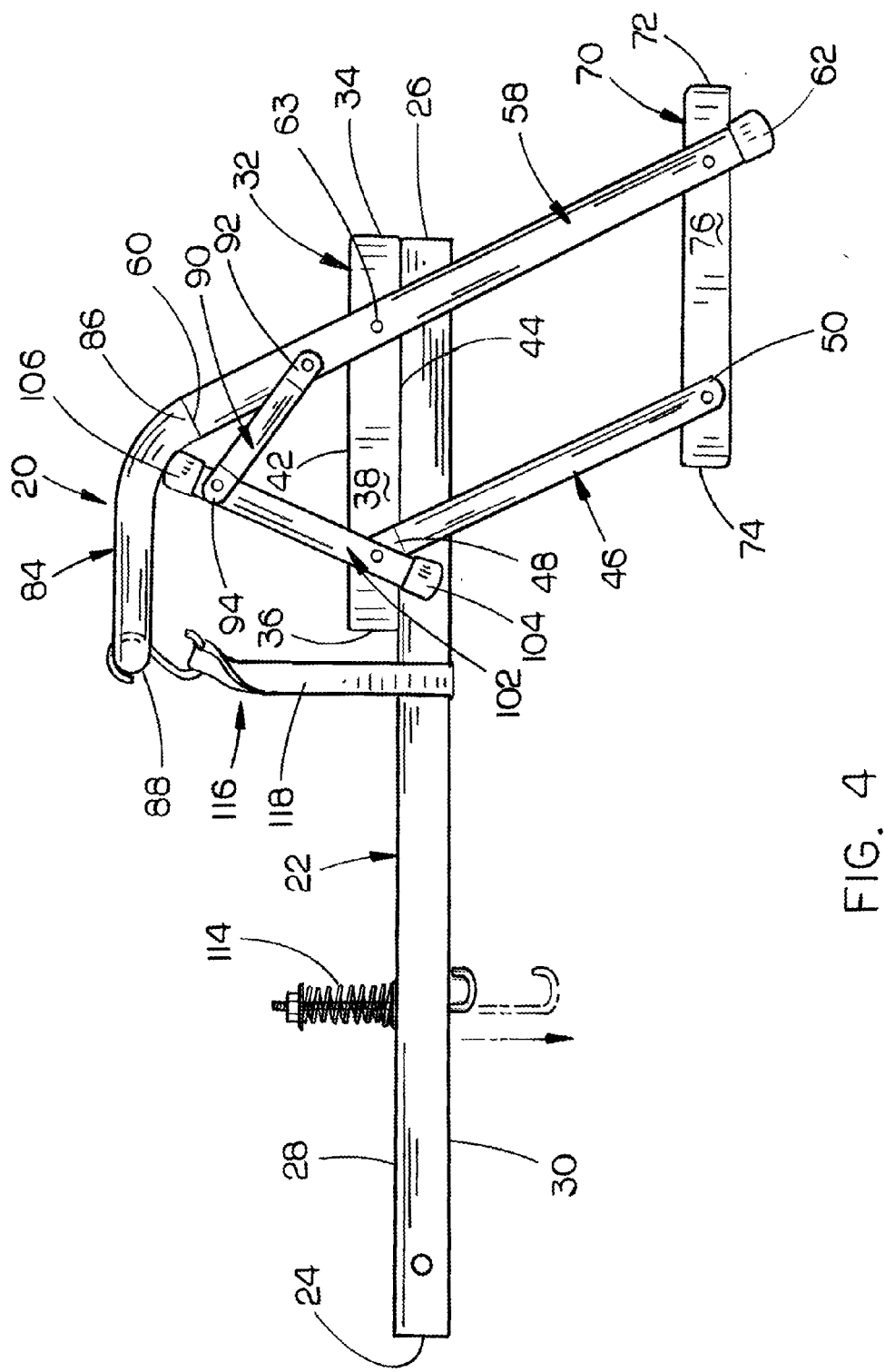
FIG. 4 is a left side view of the trailer hitch step assembly of this invention in its operative position.
Figure 5:
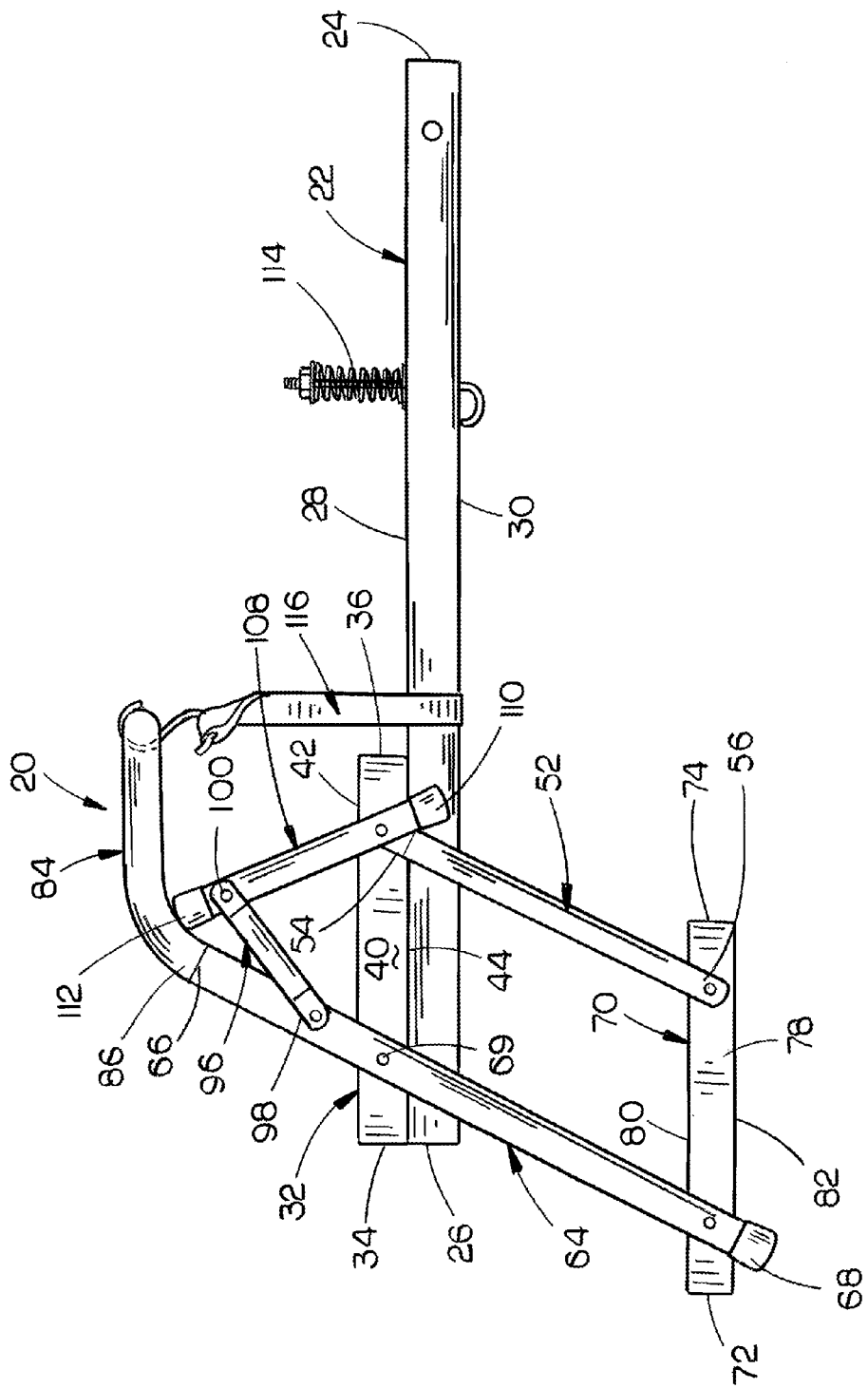
FIG. 5 is a right side view of the trailer hitch step assembly of this invention in its operative position.

The trailer hitch step assembly 20 of this invention is selectively pivotally movable with respect to the support arm 22 between an operative position as seen in FIG. 1 and a folded stowed position as seem in FIG. 2. The second step 70 is positioned below the first step 32 when the trailer hitch step assembly 20 is in its operative position. The rearward end 72 of the second step 70 is positioned rearwardly of the rearward end 34 of the first step 32 when the trailer hitch assembly 20 is in the operative position of FIG. 1.

The second step 70 is in engagement with the lower side 30 of the support arm 22 when the trailer hitch assembly 20 is in its folded stowed position. The second step 70 is positioned forwardly of the first step 32 when the trailer hitch step assembly 20 is in its folded stowed position.

Figure 6:
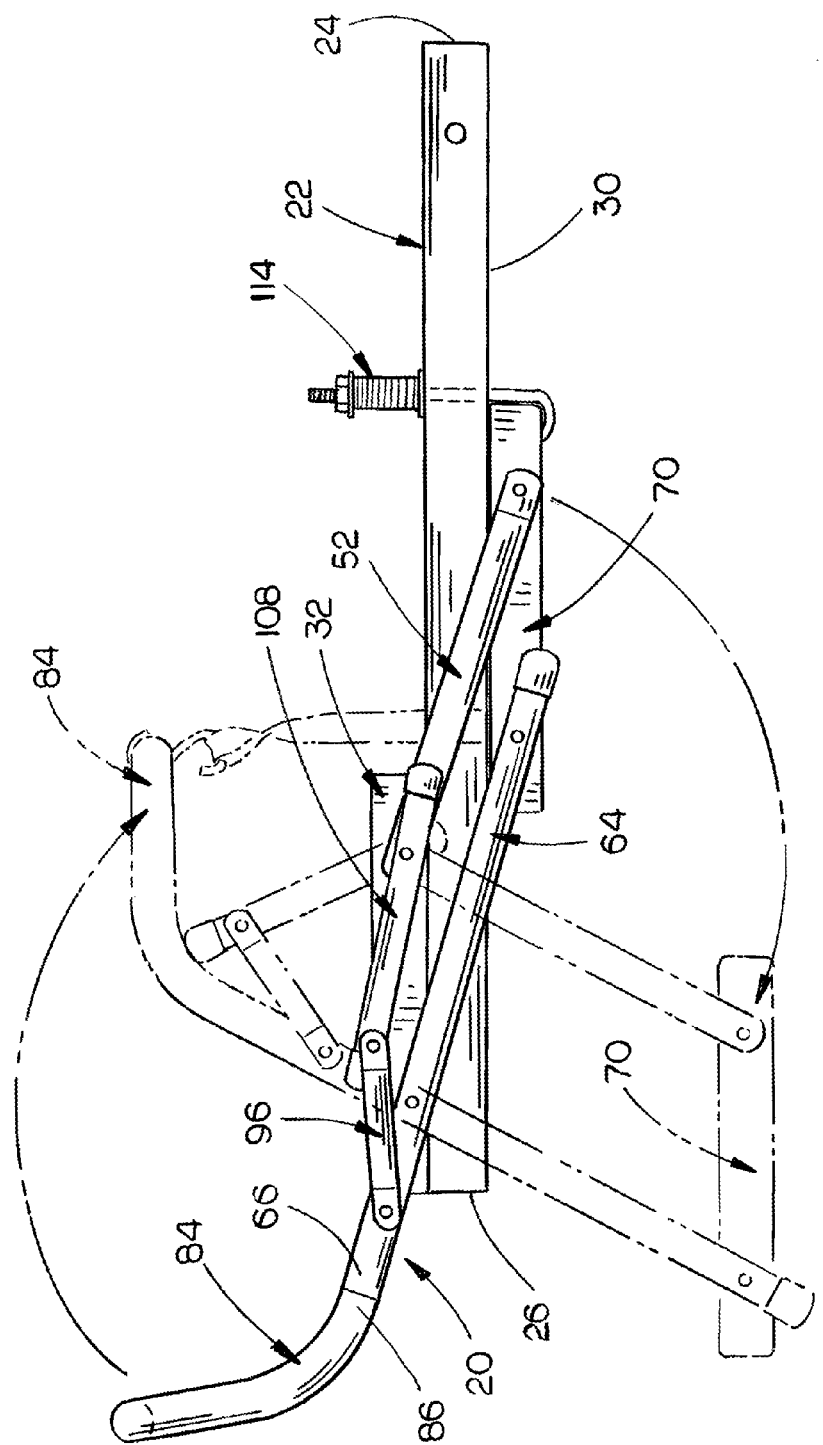
FIG. 6 is a right side view of the trailer hitch step assembly of this invention in its folded stowed position with the broken lines illustrating the trailer hitch step assembly in its operative position.

The trailer hitch step assembly 20 also includes a locking device 114 for maintaining the trailer hitch step assembly 20 in its folded stowed position as seen in FIG. 6.

The numeral 116 refers to one way of maintaining the trailer hitch step assembly 20 in its operative position. As seen, a strap 118 extends around support arm 22 and has its ends hooked to the U-shaped support 84. Other ways of maintaining the assembly 20 in its operative position could be provided such as pins or the like which prevent the pivotal movement of the assembly 26.

The trailer hitch step assembly 20 is easily secured to the rearward end of a hitch receiver 18 by inserting the forward end 24 of the support arm 22 therein. When the trailer hitch step assembly is in its operative position, a person may easily gain access to the rearward end of the pickup box or the camper or tent by merely stepping on the second step 70 and then stepping onto the first step 32. The person may then step from the step 32 onto the camper or tent position on the tailgate or may step onto the tailgate itself if the camper or the tent is not positioned on the open tailgate 16. The U-shaped support 84 not only provides stability to the assembly 20 but also enables a person to grasp the same when climbing upwardly onto the steps 70 and 32 and onto the tailgate.

The assembly 20 may be easily pivotally moved from its operative position to its stowed position by disconnecting the strap 116 from the U-shaped support 84. When the assembly 20 is pivotally moved to the position of FIG. 6, the locking mechanism 114 engages the forward end of the second step 70 to maintain the assembly in its folded position as illustrated by solid lines in FIG. 6.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:
1. A trailer hitch step assembly adapted for attachment to a hitch receiver having an open rearward end with the hitch receiver being mounted on the rearward end of a truck having a tailgate which is movable between open and closed positions, comprising:
an elongated and horizontally disposed support arm having a forward end, a rearward end, an upper side and a lower side;
said forward end of said support arm being configured to be received in the open rearward end of the hitch receiver and selectively removably secured thereto;
a horizontally disposed first step having a rearward end, a forward end, a first side, a second side, an upper side and a lower side;
said first step being positioned on said upper side of said support arm and fixedly secured thereto at said rearward end of said support arm;
an elongated first pivot arm having first and second ends;
said first end of said first pivot arm being pivotally secured to said first side of said first step adjacent said forward end of said first step;
an elongated second pivot arm having first and second ends;
said first end of said second pivot arm being pivotally secured to said second side of said first step adjacent said forward end of said first step;
an elongated third pivot arm having first and second ends;
said third pivot arm being pivotally secured, intermediate its length, to said first side of said first step forwardly of said rearward end of said first step;
an elongated fourth pivot arm having first and second ends;
said fourth pivot arm being pivotally secured, intermediate its length, to said second side of said first step forwardly of said rearward end of said first step;
a horizontally disposed second step having a rearward end, a forward end, a first side, a second side, an upper side and a lower side;
said second step being positioned below said first step;
said second end of said first pivot arm being pivotally secured to said first side of said second step adjacent said forward end of said second step;
said second end of said second pivot arm being pivotally secured to said second side of said second step adjacent said forward end of said second step;
said second end of said third pivot arm being pivotally secured to said first side of said second step adjacent said rearward end of said second step;
said second end of said fourth pivot arm being pivotally secured to said second side of said second step adjacent said rearward end of said second step;
a generally U-shaped support having first and second ends;
said first end of said generally U-shaped support being secured to said first end of said third pivot arm;
said second end of said generally U-shaped support being secured to said first end of said fourth pivot arm;
said generally U-shaped support extending upwardly and forwardly from said first ends of said third and fourth pivot arms;
an elongated fifth pivot arm having first and second ends;
said first end of said fifth pivot arm being pivotally secured to said first end of said third pivot arm adjacent said first end of said third pivot arm;
an elongated sixth pivot arm having first and second ends;
said first end of said sixth pivot arm being pivotally secured to said first end of said fourth pivot arm adjacent said first end of said fourth pivot arm;
an elongated seventh pivot arm having first and second ends;
said second end of said fifth pivot arm being pivotally secured to said seventh pivot arm adjacent said first end of said seventh pivot arm;
an elongated eighth pivot arm having first and second ends;
said second end of said sixth support arm being pivotally secured to said eighth pivot arm adjacent said first end of said eighth pivot arm;
the trailer hitch step assembly being selectively pivotally movable with respect to said support arm between an operative position and a folded stowed position;
said second step being horizontally disposed and positioned below said horizontally disposed first step when the trailer hitch step assembly is in said operative position;
said rearward end of said second step being positioned rearwardly of said rearward end of said first step when the trailer hitch step assembly is in said operative position;
said second step being horizontally disposed when said trailer hitch assembly is in its said folded stowed position;
said second step being in engagement with said lower side of said support arm when the trailer hitch step assembly is in said folded stowed position;
said second step being positioned forwardly of said first step when the trailer hitch step assembly is in said folded stowed position;
said support arm having a length sufficient to position said first and second steps rearwardly of the tailgate when the tailgate is in its open position and the trailer hitch assembly is in its said operative position; and
a locking device mounted on said support arm which engages said second step for maintaining a trailer hitch assembly in said folded stowed position.

2. A trailer hitch step assembly adapted for attachment to a hitch receiver having an open rearward end with the hitch receiver being mounted on the rearward end of a truck having a tailgate which is movable between open and closed positions, comprising:
an elongated and horizontally disposed support arm having a forward end, a rearward end, an upper side and a lower side;
said forward end of said support arm being configured to be received in the open rearward end of the hitch receiver and selectively removably secured thereto;
a horizontally disposed first step having a rearward end, a forward end, a first side, a second side, an upper side and a lower side;
said first step being positioned on said upper side of said support arm and fixedly secured thereto at said rearward end of said support arm;
an elongated first pivot arm having first and second ends;
said first end of said first pivot arm being pivotally secured to said first side of said first step adjacent said forward end of said first step;
an elongated second pivot arm having first and second ends;
said first end of said second pivot arm being pivotally secured to said second side of said first step adjacent said forward end of said first step;
an elongated third pivot arm having first and second ends;

said third pivot arm being pivotally secured, intermediate its length, to said first side of said first step forwardly of said rearward end of said first step;

an elongated fourth pivot arm having first and second ends;

said fourth pivot arm being pivotally secured, intermediate its length, to said second side of said first step forwardly of said rearward end of said first step;

a horizontally disposed second step having a rearward end, a forward end, a first side, a second side, an upper side and a lower side;

said second step being positioned below said first step;

said second end of said first pivot arm being pivotally secured to said first side of said second step adjacent said forward end of said second step;

said second end of said second pivot arm being pivotally secured to said second side of said second step adjacent said forward end of said second step;

said second end of said third pivot arm being pivotally secured to said first side of said second step adjacent said rearward end of said second step;

said second end of said fourth pivot arm being pivotally secured to said second side of said second step adjacent said rearward end of said second step;

a generally U-shaped support having first and second ends;

said first end of said generally U-shaped support being secured to said first end of said third pivot arm;

said second end of said generally U-shaped support being secured to said first end of said fourth pivot arm;

said generally U-shaped support extending upwardly and forwardly from said first ends of said third and fourth pivot arms;

an elongated fifth pivot arm having first and second ends;

said first end of said fifth pivot arm being pivotally secured to said first end of said third pivot arm adjacent said first end of said third pivot arm;

an elongated sixth pivot arm having first and second ends;

said first end of said sixth pivot arm being pivotally secured to said first end of said fourth pivot arm adjacent said first end of said fourth pivot arm;

an elongated seventh pivot arm having first and second ends;

said second end of said fifth pivot arm being pivotally secured to said seventh pivot arm adjacent said first end of said seventh pivot arm;

an elongated eighth pivot arm having first and second ends;

said second end of said sixth support arm being pivotally secured to said eighth pivot arm adjacent said first end of said eighth pivot arm;

the trailer hitch step assembly being selectively pivotally movable with respect to said support arm between an operative position and a folded stowed position;

said second step being horizontally disposed and positioned below said horizontally disposed first step when the trailer hitch step assembly is in said operative position;

said rearward end of said second step being positioned rearwardly of said rearward end of said first step when the trailer hitch step assembly is in said operative position;

said second step being horizontally disposed when said trailer hitch assembly is in its said folded stowed position;

said second step being in engagement with said lower side of said support arm when the trailer hitch step assembly is in said folded stowed position;

said second step being positioned forwardly of said first step when the trailer hitch step assembly is in said folded stowed position;

said support arm having a length sufficient to position said first and second steps rearwardly of the tailgate when the tailgate is in its open position and the trailer hitch assembly is in its said operative position; and structure which selectively connects said U-shaped support and said support arm to maintain the trailer hitch step assembly in said operative position.

\* \* \* \* \*